Dec. 23, 1952     A. G. NICKLE ET AL     2,622,945

BEARING PROTECTION MEANS

Filed Oct. 7, 1948

Inventors.
Arthur G Nickle.
Barney Wasaloski

BY Frank C Karman
Attorney.

Patented Dec. 23, 1952

2,622,945

UNITED STATES PATENT OFFICE 2,622,945

BEARING PROTECTION MEANS

Arthur G. Nickle and Barney J. Wasalaski,
Saginaw, Mich.

Application October 7, 1948, Serial No. 53,166

2 Claims. (Cl. 308—187.1)

1

This invention relates to means for protecting a shaft bearing from particles of dust or comminuted material of an abrasive nature, the source of the material being a processing chamber in which the shaft is operated. More especially it pertains to a bearing structure that is detachably secured to the chamber wall, the wall having an aperture through which the shaft projects to receive the bearing. Operating under these conditions, the life of the bearing may be endangered by the material escaping through the aperture, especially so if the material is of an abrasive nature.

It is an object of this invention to provide a means that will afford positive protection for the bearing without resorting to any form of a stuffing box and gland or other frictional closing means.

Another object of the invention is to provide means that will protect the shaft from abrasion at the point where it passes through the chamber wall.

To these and other ends, the invention consists in the novel features and combinations of parts, to be hereinafter described and finally pointed out in the claims.

Figure 1:
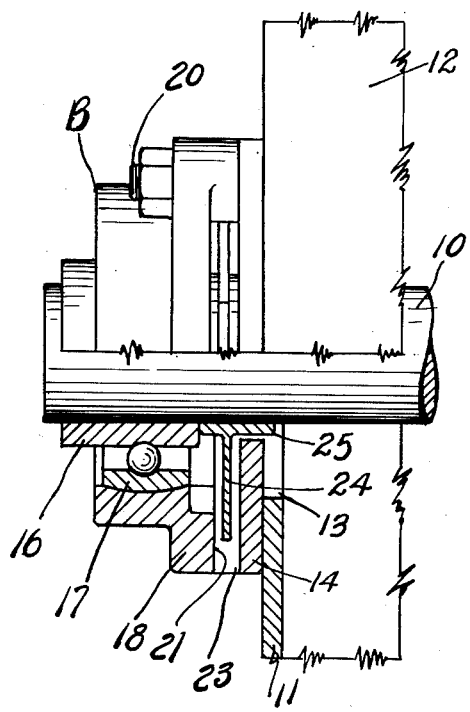
Fig. 1 is a part-sectional elevation showing a processing chamber, a shaft passing through the chamber wall, a bearing for the shaft, and the means to protect the shaft and bearing from the chamber materials that may escape through the shaft aperture.
Figure 2:
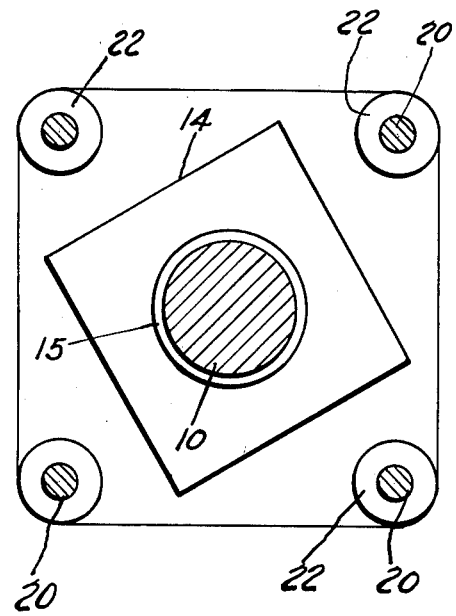
Fig. 2 is an end view of the assembly shown in Fig. 1, the chamber wall being omitted to expose the bearing protecting means.

The present invention relates to means for protecting a bearing, located adjacent an orifice in a chamber, from dust escaping through said orifice, and is a continuation, in part, of our application for "Bearing Protection Means," filed September 28, 1942, Serial No. 460,022, now abandoned.

Referring now to the drawing, the numeral 10 indicates a horizontal shaft that projects outwardly through the side wall 11 of a processing chamber 12, the shaft opening 13 being considerably larger than the shaft. The opening 13 is closed by a removable wall plate 14 that has an aperture 15 for the rotating shaft. The projecting end of the shaft 10 is journaled in a conventional ball bearing unit "B" having an inner race 16 and an outer race 17, the unit being mounted in the flanged structure 18, which together with the wall plate 14, are clamped to the chamber wall 11 by means of bolts 20.

The inner face 21 of the bearing structure "B" parallels the wall plate 14 and is axially spaced therefrom by the bosses 22 that surround the bolts 20, thereby forming an open passageway 23 that is adapted to receive any chamber material that may escape through the shaft aperture 15, and likewise, any oil or lubricant that may escape from the adjacent end of the bearing. In a well compacted assembly, the passageway does not exceed the diameter of the shaft.

Figure 3:
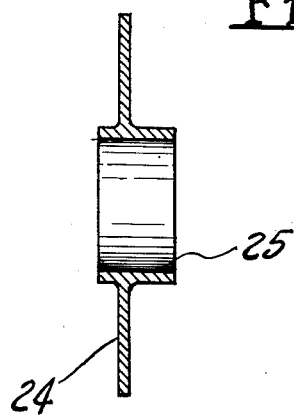
Fig. 3 is a sectional edge view of the bearing-protecting means shown in Figs. 1 and 2.

The protecting means for the bearing, and likewise the shaft where it passes through the chamber wall aperture, comprises a thin flat disk 24 as shown in Fig. 3, which is bored for a press fit on the shaft when it is positioned for rotation within the confines of the open passageway 23. The shape of the disk is immaterial, but it is important that it be made large enough to serve as a rotating barrier that will positively prevent the chamber material escaping through the shaft aperture 14 from traveling to the bearing unit or commingling with the oil escaping from the bearing. In this respect, to insure ample protection for the bearing, it is found necessary in practice to provide a disk that has a minimum radial sweep beyond the shaft that is greater than the axial distance between the bearing structure and the wall plate, this measurment being made at a point of minimum radial sweep of the disk.

The sleeve-like hub 25 on the chamber side of the flinger disk is made long enough to project through the aperture 15 in the removable wall plate 14, the outside diameter of the sleeve being made a close non-frictional fit with the bore of the wall plate. In operation, the escaping chamber material tends to wear the plate aperture larger and the sleeve 25 smaller. When the combined wear results in an excessive loss of chamber material, the wall plate and flinger disk may be renewed at a relatively small expense to re-establish the original close-fitting non-frictional relation between these parts.

On the bearing side of the flinger disk, the hub 26 is made a predetermined length, so that when it abuts the inner ball race end-to-end, the disk will be positioned intermediately between inner face 21 of bearing flange 18 and wall plate 14, so as to provide an open space on each side of the disk. This construction makes it practical to assemble the flinger disk and the bearing on the outer end of the shaft and then simultaneously force both elements into approximate working relation with the chamber wall, the final positioning being effected by simply tightening the nuts 27 on the bearing bolts When so positioned the disk is free to operate without frictional contact with the bearing flange or the chamber wall plate.

The flinger disk is shown with the hubs 25 and 26 integral therewith. However, it will not be departing from the spirit of our invention if either of these elements are made separate or detachable with respect to the disk, providing they are associated with the disk and rotate therewith.

What we claim is:

1. In combination, a processing chamber containing material, a rotatable shaft horizontally disposed in the chamber and projecting through an aperture in the side wall thereof, a flanged bearing structure in which the projecting end of the shaft is journaled, said structure being detachably secured to the chamber wall and spaced therefrom to form an open passageway which receives and discharges chamber material escaping through the shaft aperture, means mounted on the shaft between the bearing flange and the chamber wall for protecting the bearing from the escaping chamber material, said means being a flinger disk which rotates in spaced-apart relation with the stationary elements adjacent thereto, and means formed integral with the flinger disk for protecting the shaft against abrasion caused by the material escaping through the shaft aperture, said means being a sleeve which surrounds the shaft and projects through the chamber wall without frictional contact with a stationary element.

2. In combination, a processing chamber containing dust-laden material, an opening in the chamber wall, a removable cover plate for the opening, a rotatable shaft in the chamber, said shaft projecting through an aperture in the cover plate that is relatively small as compared with the chamber opening, a flanged bearing structure in which the projecting end of the shaft is journaled, the inner face of the flange being axially spaced from the cover plate to form a passageway open to the atmosphere and adapted to receive and discharge dust-laden material escaping from the shaft aperture, a radial flinger disk mounted on the shaft for rotation within the confines of the passageway without frictional contact with a stationary element, said disk having a sleeve-like hub that projects inwardly through the shaft aperture without frictional contact with a stationary element, and means in common for detachably securing the cover plate and bearing flange to the chamber wall, said means being a plurality of threaded clamping bolts.

ARTHUR G. NICKLE.
BARNEY J. WASALASKI.

REFERENCES CITED

The following references are of record in the file of this patent:

UNITED STATES PATENTS

| Number | Name | Date |
|---|---|---|
| 1,232,343 | Lockwood | July 3, 1917 |
| 1,413,425 | Rice | Apr. 18, 1922 |
| 2,153,537 | Heath et al. | Apr. 11, 1939 |

FOREIGN PATENTS

| Number | Country | Date |
|---|---|---|
| 555,597 | France | July 3, 1923 |